United States Patent
Tornare

[11] Patent Number: 6,048,094
[45] Date of Patent: Apr. 11, 2000

[54] METHOD FOR MEASURING TEMPERATURE USING A NEGATIVE TEMPERATURE COEFFICIENT SENSOR, AND CORRESPONDING DEVICE

[75] Inventor: Jean Marc Tornare, Toulouse, France

[73] Assignee: Siemens Automotive S.A., Toulouse-Cedex, France

[21] Appl. No.: 08/875,145

[22] PCT Filed: Dec. 6, 1995

[86] PCT No.: PCT/EP95/04794

§ 371 Date: Jul. 26, 1997

§ 102(e) Date: Jul. 26, 1997

[87] PCT Pub. No.: WO96/20394

PCT Pub. Date: Jul. 4, 1996

[30] Foreign Application Priority Data

Dec. 26, 1994 [FR] France .................................. 94 15738

[51] Int. Cl.$^7$ .............................. G01K 7/16; H03K 5/13; H01H 35/00
[52] U.S. Cl. ........................... 374/183; 327/78; 307/116; 307/117; 702/99
[58] Field of Search .............................. 374/183; 327/78; 341/126, 151, 155, 166; 307/116, 117; 702/99

[56] References Cited

U.S. PATENT DOCUMENTS

| 3,930,256 | 12/1975 | Amemiya | 340/347 |
| 5,140,302 | 8/1992 | Hara et al. | 374/183 |
| 5,313,848 | 5/1994 | Santin et al. | 374/170 |

FOREIGN PATENT DOCUMENTS

| 0108325A1 | 5/1984 | European Pat. Off. . | |
| 0203350A2 | 12/1986 | European Pat. Off. . | |
| 0321450 | 6/1989 | European Pat. Off. | 374/163 |
| 3514862 | 11/1986 | Germany | 374/163 |
| 4285831 | 10/1992 | Japan | 374/163 |

*Primary Examiner*—Diego Gutierrez
*Assistant Examiner*—Gail Verbitsky
*Attorney, Agent, or Firm*—Herbert L. Lerner; Laurence A. Greenberg; Werner H. Stemer

[57] ABSTRACT

The present invention relates to a method for measuring temperature using a negative temperature coefficient sensor and a device employing a method of this type. The present invention applies more particularly to the field of automobile electronics. The temperature sensor is associated with a signal processing stage including at least one transistor connected in parallel with at least one "pull up" resistor. An analog/digital converter receives a voltage taken at a mid-point between the sensor and the "pull up" resistors. The method includes driving the transistor with a square-wave voltage so that the transistor is alternately and regularly on, then off, measuring the value of the voltage at an analog input of the converter when the transistor is on and when the transistor is off, determining the saturation voltage of the transistor on the basis of these two measurements, and deducing from the saturation voltage the corrected voltage value and deducing from the corrected voltage value the temperature prevailing around the sensor.

8 Claims, 1 Drawing Sheet

METHOD FOR MEASURING TEMPERATURE USING A NEGATIVE TEMPERATURE COEFFICIENT SENSOR, AND CORRESPONDING DEVICE

BACKGROUND OF THE INVENTION

1. Field of the Invention

The present invention relates to a method for measuring temperature using a negative temperature coefficient sensor. More particularly, a method of this type is intended to be employed in the field of automobile electronics.

2. Description of the Related Art

It is already known to use sensors whose resistance varies as a function of the temperature of the medium in which they are immersed. By measuring this resistance variation, and after processing the measured signal by a common signal processing means, a digital value N is determined which represents the temperature prevailing around the sensor.

Conventionally, as regards temperature sensors with negative temperature coefficient (also referred to as NTC sensors), a voltage source VA is applied to a sensor and a resistor which is connected in series (referred to as a "pull up" resistor) is connected to the positive pole of the voltage source. An analog measured signal, taken from a midpoint lying between the resistor and the sensor, is sent to an analog/digital converter. This converter also receives a reference voltage, so as to generate a digital value N representing the temperature measured by the sensor.

However, devices of this type have a major drawback, namely: it is difficult for them to measure with high precision a temperature which varies over an extended range.

In order to overcome this drawback, it is known to switch the reference voltage of the converter between a plurality of different reference voltages. One measured temperature range corresponds to each reference voltage. This provides a plurality of measurement scales for accurately monitoring a temperature which varies over an extended range. For example, in the automotive field, the temperature to be measured may vary from −40° to +140° C.

The drawback of devices of this type with multiple reference voltages is that the converter must be provided with a plurality of accurately calibrated voltage sources. Such a multiplicity of calibrated voltage sources is expensive.

It is therefore desired to create a method for measuring temperature which uses only a single voltage source, while ensuring that the measurement is highly accurate over the entire extent of the temperature range.

It is already known, to this end, to vary the resistance of the resistor connected in series with the sensor (by switching a transistor connected in parallel with this resistor), in order to improve temperature monitoring on different temperature scales. However, this technique has the drawback of changing the current flowing in the measurement branch and, in particular, it introduces errors due to the voltage drops and the leakage currents of the transistors.

SUMMARY OF THE INVENTION

The object of the present invention is therefore to use a single reference voltage, but to determine accurately the errors resulting from the presence of the transistors in the signal-processing stage, in order to take them into account and to eliminate errors associated with the presence of the transistors.

To this end, the present invention relates to a method for measuring temperature using a negative temperature coefficient sensor, said sensor having a variable internal resistance and being associated with a signal processing stage comprising at least one transistor connected in parallel with at least one so-called "pull up" resistor, a voltage through the signal processing means taken at a mid-point between the sensor and the "pull up" resistors being read on an analog input of an analog/digital converter, said method being one which consists in:

driving the transistor with a so-called square-wave voltage so that the transistor is alternately and regularly on, then off, measuring the value of the voltage at the analog input of the converter when the transistor is on and when the transistor is off, determining the saturation voltage of the transistor on the basis of these two measurements by the signal processing means, deducing from the saturation voltage the corrected voltage value arriving at the analog input of the converter by the signal processing means and deducing from this corrected voltage the temperature prevailing around the sensor.

Thus, by measuring the voltage at the input of the converter when the transistor in parallel with the "pull up" resistor is on and off, the saturation voltage of the transistor is determined. The voltage measured at the input of the converter is then corrected by taking into account the saturation voltage of the transistor. It is thereby possible to have several measurement ranges while using a single voltage source. Switching from one range to another takes place using transistors connected in parallel with a "pull up" resistor, without interfering with the measurement since the saturation voltage of each switched transistor is known. When this saturation voltage is taken into account, the measurements taken are no longer subject to errors resulting from the presence of the transistors.

In addition, this saturation voltage may be determined continuously. In this case, the method according to the invention is a method involving learning the saturation voltage of the transistors connected in parallel with a "pull up" resistor.

Advantageously, the value of the saturation voltage is filtered before being used in the calculation of the temperature prevailing around the sensor.

When the saturation voltage has been determined, the value of the voltage between the "pull up" resistors and the sensor is then obtained with high accuracy and independently of the saturation voltage of the transistor.

The present invention also relates to a device for measuring temperature employing the method indicated above.

BRIEF DESCRIPTION OF THE DRAWINGS

Other objects, features and advantages of the present invention will emerge more clearly from the following description, by way of non-limiting example, and with reference to the appended drawings, in which.

DESCRIPTION OF THE PREFERRED EMBODIMENTS

Figure 1:
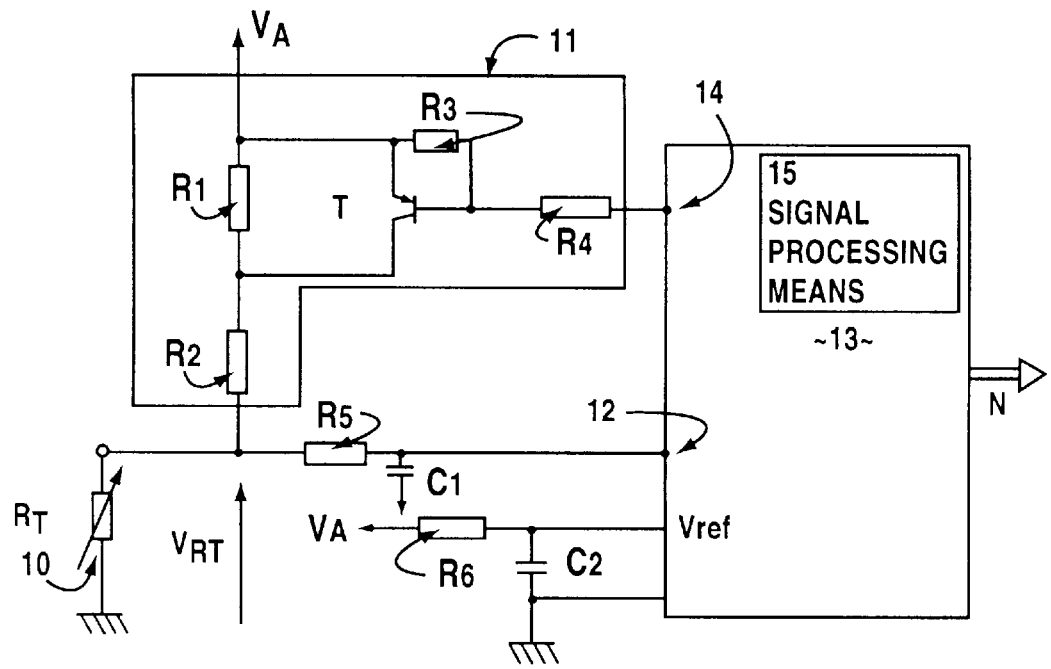
FIG. 1 is a schematic view representing a device for measuring temperature which uses the method according to the present invention.

According to the embodiment represented in FIG. 1, a temperature-measurement sensor 10 is associated with a stage 11 in connection with a signal processing means 15 for processing the output signal of the sensor. This processed signal is then fed to the analog input 12 of an analog/digital converter 13. The sensor 10 used in the context of the embodiment represented has an internal resistance $R_T$ which varies with the temperature of the medium in which it is immersed The resistance $R_T$ of the sensor decreases as the temperature of the medium increases. A sensor of this type is referred to as a negative temperature coefficient sensor.

In a conventional fashion, the converter 13 is supplied with a reference voltage $V_{ref}$, filtered in known fashion by a filter $R_6$, $C_2$.

Similarly, it will be noted that the voltage $V_{RT}$ collected across the resistance of the sensor is filtered in known fashion by a filter $R_5$, $C_1$.

The stage 11 for processing the sensor signal in connection with the signal processing means 15 consists, in the example which is represented, of two so-called "pull up" resistors $R_1$ and $R_2$. These two resistors are connected in series and have the supply voltage $V_A$ applied to them. The resistor $R_1$ has a transistor T connected in parallel with it. This transistor is further associated with two resistors $R_3$ and $R_4$. In conventional fashion these resistors $R_3$ and $R_4$ improve the switching of the transistor T.

The converter 13 has an output 14 designed to control the transistor T. In the example which is represented, this output 14 sends a substantially square-wave signal to the transistor T. For this reason, during one half-cycle of this signal, the transistor T is on, and the transistor T from signal processing means 15 is off during the following half-cycle.

When the transistor is off, the two resistors $R_1$ and $R_2$ are in series with the resistance $R_T$ of the sensor. When the transistor T is on, only the resistor $R_2$ is in series with the resistance of the sensor. For this reason, two temperature measurement ranges are possible.

The sequencing of the method and the operation of the device according to the invention are described below.

The saturation voltage of the transistor T is firstly determined. To do this, a control signal of substantially square waveform is sent to the transistor T from the signal processing means 15. When the transistor is off, the voltage $V_{RT}$ arriving at the input 12 of the converter 13 is measured. The value $N_0$ of this voltage, as measured by the converter, is as follows:

$$N_0 = 1023 \times \frac{R_T}{R_T + R_1 + R_2} \qquad 1)$$

In this formula, 1023 is a constant corresponding to the dynamic response of the converter.

When the transistor T is on, the voltage $V_{RT}$ at the input 12 of the converter is measured. The value $N_1$ of this voltage is as follows:

$$N_1 = \frac{R_T}{R_T + R_2} \times \frac{[V_A - V_{CE}]}{V_A} \times 1023 \qquad 2)$$

in which $V_{CE}$ is the saturation voltage of the transistor T and $V_A$ is the supply voltage of the measurement branch containing the "pull up" resistors $R_1$ and $R_2$. These two equations (1 and 2) give:

$$R_T = \frac{R_1 + R_2}{1023 - N_0} \times N_0 \qquad 3)$$

and $$V_{CEcorr} = \frac{[V_A - V_{CE}]}{V_A} = \frac{1023 \times R_2 + N_0 \times R_1}{[R_1 + R_2] \times 1023} \times \frac{N_1}{N_0} \qquad 4)$$

The saturation voltage of the transistor T is thus directly defined on the basis of the values $N_0$ and $N_1$. All the variables in this last equation are known. It is therefore easy to determine the saturation voltage $V_{CEcorr}$. Secondly, the measured saturation voltage is filtered using a digital filter so as to improve the resolution of the measurement. To this end, it is assumed that $V_{CEcorr}$ at time n is defined, in relation to the value of $V_{CEcorr}$ at time n−1, according to the following equation:

$$V_{CEcorr}(n) = V_{CEcorr}(n-1) + \frac{V_{CEcorr}(n) - V_{CEcorr}(n-1)}{10} \qquad 5)$$

Thirdly, the corrected value of $N_1$ is calculated by taking the saturation voltage into account by the signal processing means 15. This corrected value $N_1$ is referred to as $N_{1corr}$. The following equation is obtained:

$$N_{1corr} = \frac{N_1}{V_{CEcorr}(n)} \qquad 6)$$

The corrected values of $N_1$ and No are thereby expressed fully independently of $V_{CE}$.

Indeed, applying equation (6) gives:

$$N_{1corr} = \frac{R_T}{R_T + R_1} \times 1023 \qquad 7)$$

and $$N_0 = \frac{R_T}{R_T + R_1 + R_2} \times 1023 \qquad 8)$$

These two values can be employed directly to determine the temperature prevailing around the temperature sensor.

It will be noted that, by virtue of the method according to the invention, the determination of the temperature of the medium in which the sensor is immersed is independent of the saturation voltage of the transistor T. For this reason, it is now possible to use just a single reference voltage for the converter, while providing several temperature-measurement ranges (two, in the example represented in FIG. 1). In addition, in order to produce a device which uses the method according to the invention, it is not necessary to equip the converter with a complementary analog input.

Figure 2:
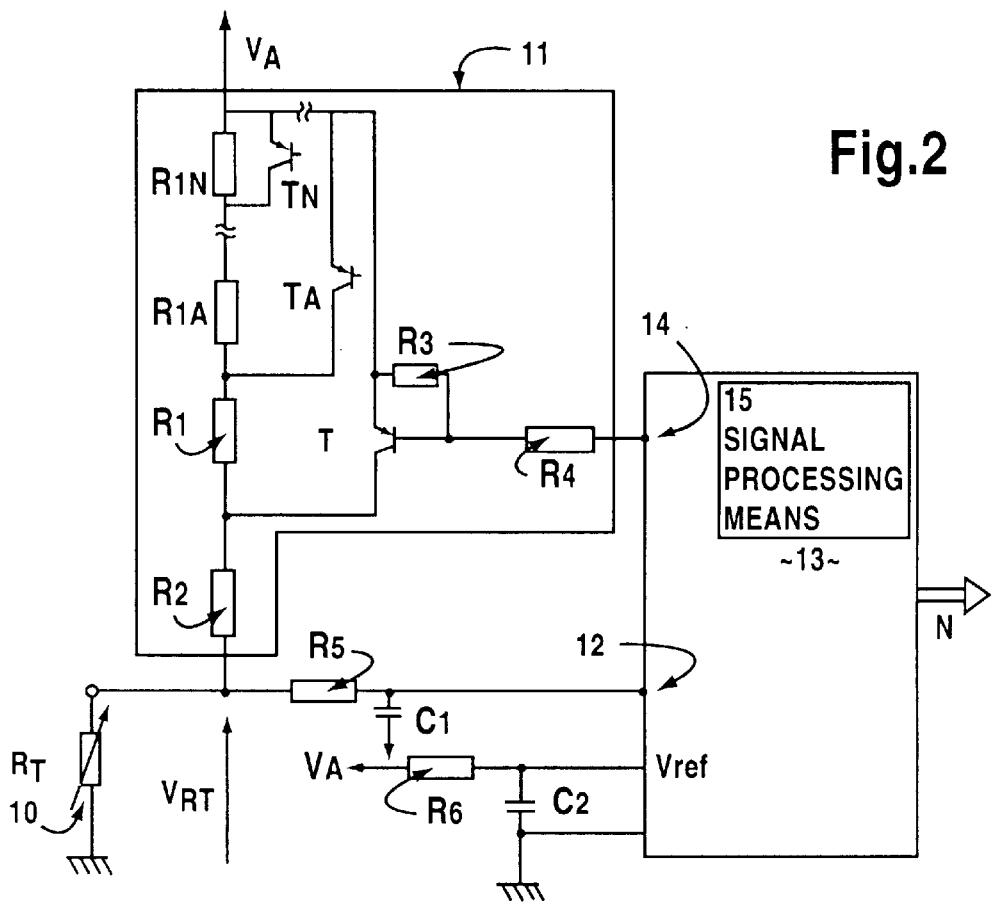
FIG. 2 is a schematic view, similar to FIG. 1, showing a case in which more than two temperature ranges are used.

As shown by FIG. 2, the method indicated above may be generalized to the case when more than two temperature ranges are used. In this case, it is sufficient to add a number of additional "pull up" resistors equal to the desired number of additional temperature ranges. In the example represented in FIG. 2, one additional "pull up" resistor $R_{1A}$ has been added. This additional resistor $R_{1A}$ is then associated with a transistor $T_A$, as indicated above. The same method as the one set out in the context of FIG. 1 is then applied to this second transistor $T_A$ in order to determine its saturation voltage. The diagram of the circuit associated with this second transistor $T_A$ has merely been outlined in FIG. 2 so as not to overburden the drawings.

It is easy to see that, each time it is necessary to increase the number of temperature ranges, it is sufficient to add a "pull up" resistor $R_{1N}$ associated with a transistor $T_N$. Each unit consisting of this resistor $R_{1N}$ and this transistor $T_N$ operates in the same way as the resistor $R_1$ associated with the transistor T.

It should be noted that, although it is preferable and advantageous to effect the digital filtering step described above, this step is not, however, obligatory. The specific purpose of this step is to increase the measurement resolution for $V_{CE}$. When this type of filtering is not carried out, the measurement resolution of the measured $V_{CE}$ is directly degraded, and therefore so is the resolution for $N_{1corr}$.

The method and the device which are described above can be used continuously. In this case, it is possible to monitor the change in the saturation voltage of the transistor throughout its period of operation. A method of this type is thus a method involving automatic learning of the saturation voltage of a transistor. This learning process makes it possible to take into account the variations in the saturation voltage which are due to the aging of the transistor and/or to the temperature of this transistor and/or to its working conditions, etc.

But of course, the present invention is not limited to the embodiments described above. Thus, any appropriate switching means may be used instead of the transistors T, $T_A, \ldots T_N$.

I claim:

1. A method for measuring a temperature, which comprises the steps of:
   providing a negative temperature coefficient sensor having a variable internal resistance;
   connecting a signal processing stage to the sensor, the signal processing stage including at least one pull-up resistor and a transistor connected in parallel therewith;
   connecting an A/D converter to the signal processing stage, the A/D converter having an analog input receiving a voltage tapped at a node between the variable internal resistance of the sensor and the at least one pull-up resistor;
   driving the transistor with a square-wave voltage from the signal processing means alternately turning the transistor on and off, and measuring the voltage at the analog input of the A/D converter when the transistor is turned on and when the transistor is turned off;
   determining a saturation voltage of the transistor from the two measurements in the measuring step by the signal processing means; and
   deducing from the saturation voltage a corrected voltage value and ascertaining from the corrected voltage value a temperature prevailing at the sensor by the signal processing means.

2. The method according to claim 1, which further comprises the step of filtering a value of the saturation voltage of the transistor prior to the deducing step.

3. The method according to claim 1, which further comprises the step of continuously determining the saturation voltage of the transistor.

4. The method according to claim 3, which further comprises the step of monitoring a change in the saturation voltage of the transistor throughout an operation of the transistor through the signal processing means.

5. A device for measuring a temperature, comprising:
   a temperature sensor with a negative temperature coefficient and having an internal resistance;
   at least two resistors connected in series with the internal resistance of said sensor;
   a transistor connected in parallel with one of said at least two resistors such that, when said transistor is off, said at least two resistors are switched in series with said resistance of said sensor, and when said transistor is on, one of said at least two resistors is switched in series with said resistance of said sensor; and
   an A/D converter having an analog input receiving a voltage tapped at a node between said resistors and said resistance of said sensor and having a signal processing means, said signal processing means driving said transistor with a square-wave voltage from said signal processing means alternately turning said transistor on and off, determining a saturation voltage of said transistor by measuring said voltage when said transistor is turned off and when said transistor is turned on, deducing a corrected voltage value by taking into account said saturation voltage and determining from said corrected voltage value a temperature prevailing at said sensor.

6. The device according to claim 5, wherein said sensor operates in at least two temperature-measurement ranges and the device uses a single reference voltage.

7. The device according to claim 6, wherein said at least two resistors include a first resistor and a plurality of pull-up resistors, and said transistor is one of a plurality of transistors each connected in parallel with one of said pull-up resistors, each of said transistors being associated with a respective temperature-measurement range and said A/D converter being adapted to determine a respective saturation voltage of each of said transistors through said signal processing means.

8. The device according to claim 5, wherein said at least two resistors include a first resistor and a plurality of pull-up resistors, and said transistor is one of a plurality of transistors each connected in parallel with one of said pull-up resistors, each of said transistors defining a respective temperature-measurement range and said A/D converter being adapted to determine a respective saturation voltage of each of said transistors through said signal processing means.

* * * * *